(12) United States Patent
Sakamoto

(10) Patent No.: US 11,694,672 B2
(45) Date of Patent: Jul. 4, 2023

(54) ACTIVE NOISE CONTROL DEVICE AND VEHICLE

(71) Applicant: HONDA MOTOR CO., LTD., Tokyo (JP)

(72) Inventor: Kosuke Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/578,570

(22) Filed: Jan. 19, 2022

(65) Prior Publication Data

US 2022/0230621 A1 Jul. 21, 2022

(30) Foreign Application Priority Data

Jan. 20, 2021 (JP) ................. 2021-007158

(51) Int. Cl.
*G10K 11/178* (2006.01)
*B60W 50/00* (2006.01)
*B60W 50/06* (2006.01)

(52) U.S. Cl.
CPC ... *G10K 11/17854* (2018.01); *B60W 50/0098* (2013.01); *B60W 50/06* (2013.01); *G10K 11/1783* (2018.01); *G10K 11/17823* (2018.01); *G10K 11/17825* (2018.01); *G10K 11/17857* (2018.01); *G10K 11/17881* (2018.01); *B60W 2420/54* (2013.01); *G10K 2210/12* (2013.01); *G10K 2210/1282* (2013.01); *G10K 2210/3023* (2013.01); *G10K 2210/3026* (2013.01); *G10K 2210/3027* (2013.01); *G10K 2210/3028* (2013.01)

(58) Field of Classification Search
CPC ..... G10K 11/17825; G10K 2210/1282; G10K 2210/12; G10K 11/17857
See application file for complete search history.

(56) References Cited

U.S. PATENT DOCUMENTS 5,493,616 A 2/1996 Iidaka et al.
2016/0314778 A1* 10/2016 Christoph ........ G10K 11/17854

FOREIGN PATENT DOCUMENTS

JP H05-265471 A 10/1993
JP H06-282277 A 10/1994

* cited by examiner

*Primary Examiner* — Ping Lee
(74) *Attorney, Agent, or Firm* — Carrier, Shende & Associates, P.C.; Joseph P. Carrier; Fulchand P. Shende

(57) ABSTRACT

An active noise control device includes a first adaptive filter configured to generate a control signal by performing a filtering process on a reference signal corresponding to noise, and a first filter coefficient updating unit configured to update a filter coefficient of the first adaptive filter based on based on the reference signal and an added error signal acquired by adding a first error signal acquired by detecting residual noise by a first microphone and a second error signal acquired by detecting residual noise by a second microphone.

5 Claims, 7 Drawing Sheets

ACTIVE NOISE CONTROL DEVICE AND VEHICLE

CROSS-REFERENCE TO RELATED APPLICATIONS

This application is based upon and claims the benefit of priority from Japanese Patent Application No. 2021-007158 filed on Jan. 20, 2021, the contents of which are incorporated herein by reference.

BACKGROUND OF THE INVENTION

Field of the Invention

The present invention relates to an active noise control device and a vehicle.

Description of the Related Art

JP H05-265471 A discloses a vehicle compartment interior noise reduction device including a control block, a plurality of speakers, and a plurality of microphones. The control block generates a cancellation signal based on vibrations detected by the plurality of vibration sensors. The plurality of speakers generate cancellation vibrations based on the cancellation signals. The microphones detect cancellation errors between the cancellation vibrations and the vibrations from the vibration sources.

SUMMARY OF THE INVENTION

However, the active noise control device disclosed in JP H05-265471 A requires complicated control because it handles inputs from a plurality of vibration sensors, outputs from a plurality of speakers, and inputs from a plurality of microphones. Therefore, the design cost of such an active noise control device increases. In addition, such an active noise control device requires an expensive processor due to a large amount of computation, resulting in an increase in component cost.

An object of the present invention is to provide an active noise control device and a vehicle that can suitably reduce noise and realize cost reduction.

An active noise control device according to an aspect of the present invention causes an actuator to output a canceling sound based on a control signal in order to reduce noise in a vehicle compartment of a vehicle, and includes a first adaptive filter configured to generate the control signal by performing a filtering process on a reference signal corresponding to the noise, and a first filter coefficient updating unit configured to update a filter coefficient of the first adaptive filter, based on the reference signal and an added error signal that is acquired by adding a first error signal acquired by detecting residual noise due to interference between the noise and the canceling sound by a first microphone disposed on one side in the vehicle compartment with respect to a center line of the vehicle in a front-rear direction of the vehicle, and a second error signal acquired by detecting the residual noise by a second microphone disposed on another side in the vehicle compartment with respect to the center line of the vehicle.

A vehicle according to another aspect of the present invention includes the active noise control device as described above.

According to the present invention, it is possible to provide an active noise control device and a vehicle that can suitably reduce noise and realize cost reduction.

The above and other objects, features, and advantages of the present invention will become more apparent from the following description when taken in conjunction with the accompanying drawings in which a preferred embodiment of the present invention is shown by way of illustrative example.

DESCRIPTION OF THE INVENTION

Preferred embodiments of an active noise control device and a vehicle according to the present invention will be described in detail below with reference to the accompanying drawings.

Embodiment

Figure 1:
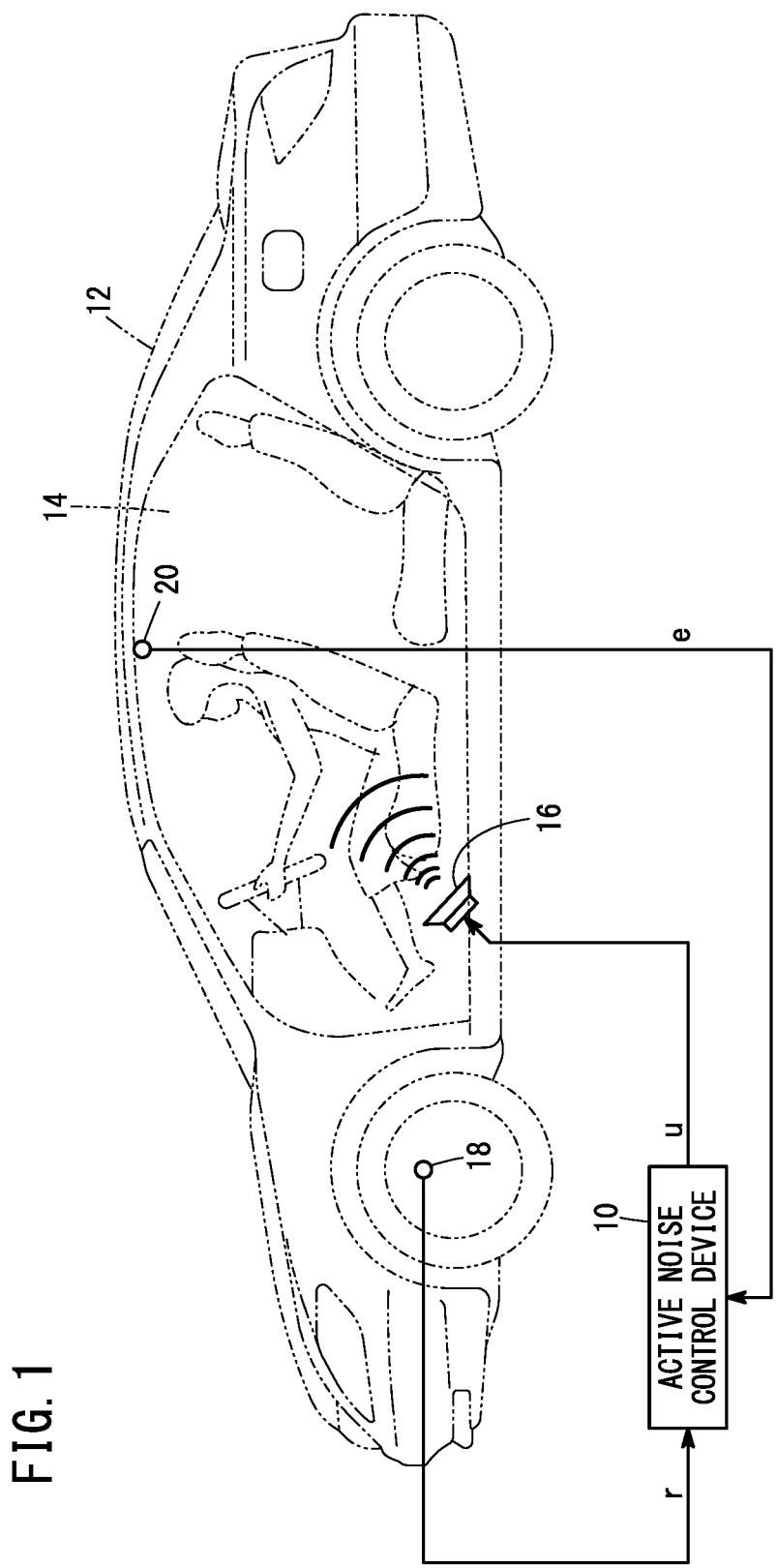
FIG. 1 is a diagram illustrating an outline of active noise control.

An active noise control device and a vehicle according to an embodiment will be described with reference to FIGS. 1 to 6. FIG. 1 is a diagram illustrating an outline of active noise control.

An active noise control device 10 causes an actuator 16 to output a canceling sound for reducing noise (vibration noise) in a vehicle compartment 14 of a vehicle 12.

The noise in the vehicle compartment 14 may include, for example, road noise. Road noise is noise that is transmitted to an occupant in the vehicle compartment 14 when a wheel vibrates due to force received from the road surface and the vibration of the wheel is transmitted to the vehicle body via a suspension.

The vehicle 12 is provided with a vibration sensor 18 that detects vibration of the vehicle 12, which is specifically an acceleration sensor. The signal r detected by the vibration sensor 18, i.e., a signal indicative of vibration, is supplied to the active noise control device 10. That is, a signal indicating vibration is supplied to the active noise control device 10.

A microphone 20 is further provided in the vehicle compartment 14. The microphone 20 detects residual noise (cancellation error noise) due to interference between the noise and the canceling sound output from the actuator 16. The residual noise detected by the microphone 20 is supplied to the active noise control device 10. That is, an error signal e detected by the microphone 20 is supplied to the active noise control device 10.

The active noise control device 10 generates a control signal u for outputting a canceling sound from the actuator 16, based on the signal r detected by the vibration sensor 18 and the error signal e detected by the microphone 20. More specifically, the active noise control device 10 generates the control signal u such that the error signal e detected by the microphone 20 is minimized. Since the actuator 16 outputs the canceling sound based on the control signal u that minimizes the error signal e detected by the microphone 20, the noise in the vehicle compartment 14 can be suitably canceled out by the canceling sound. In this way, the active noise control device 10 can reduce noise transmitted to an occupant in the vehicle compartment 14.

Figure 2:
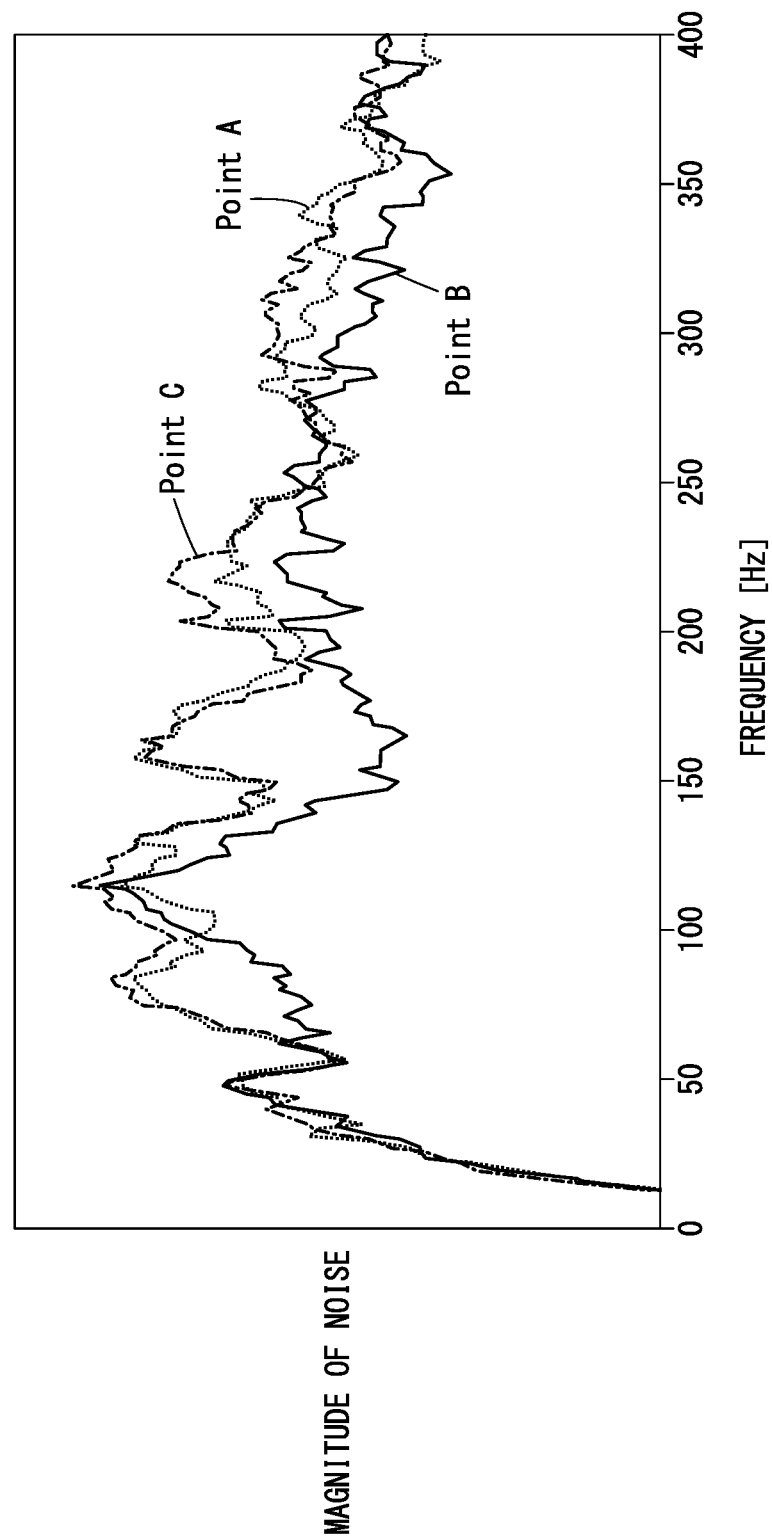
FIG. 2 is a graph illustrating a relationship between the frequency of noise and the magnitude of noise.
Figure 3:
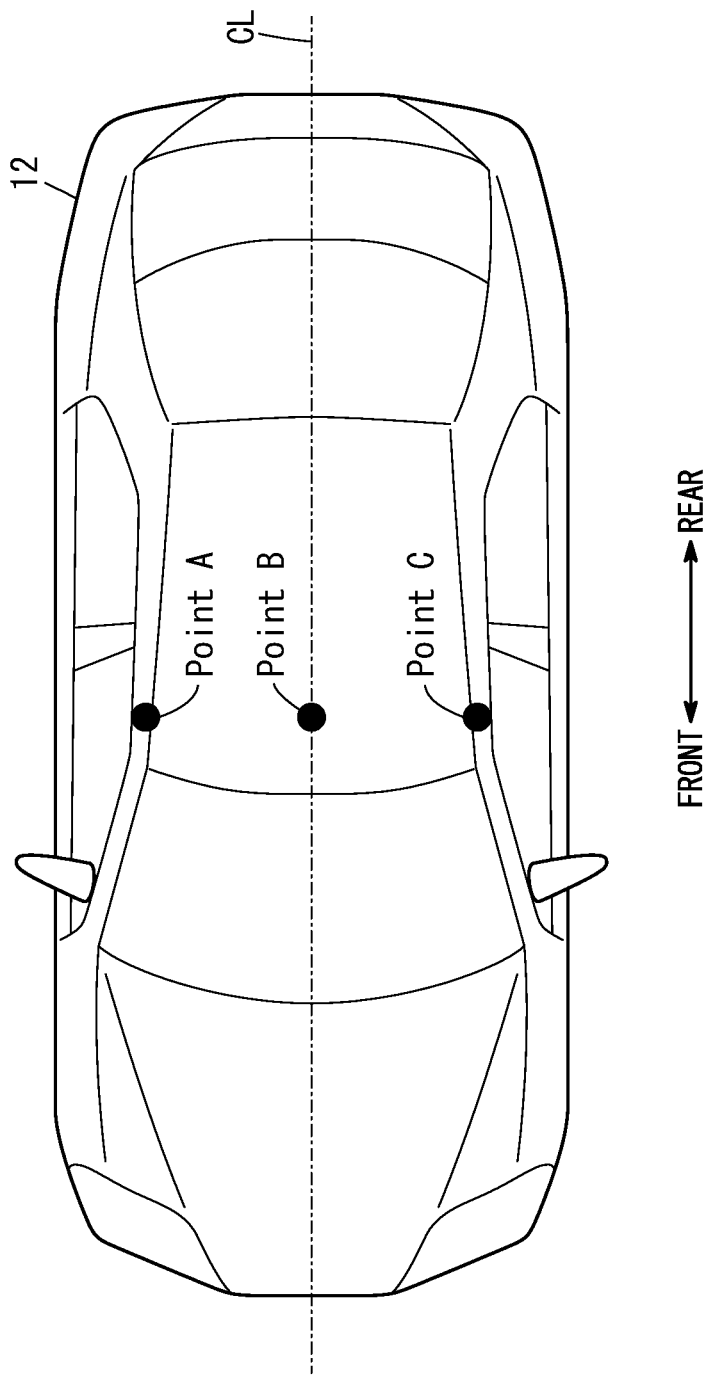
FIG. 3 is a plan view illustrating noise measurement points.

Incidentally, the distribution of noise in the vehicle compartment 14 varies depending on the frequency of the noise. FIG. 2 is a graph illustrating a relationship between the frequency of noise and the magnitude of noise. FIG. 3 is a plan view illustrating noise measurement points. A point A (measurement point A) is located on the right side in the vehicle compartment 14, with respect to a center line CL of the vehicle 12 in the front-rear direction of the vehicle 12. A point B (measurement point B) is located on the center line CL of the vehicle 12 in the front-rear direction of the vehicle 12. A point C (measurement point C) is located on the left side in the vehicle compartment 14, with respect to the center line CL of the vehicle 12 in the front-rear direction of the vehicle 12. The solid line in FIG. 2 shows the noise characteristic at the measurement point B. A dotted line in FIG. 2 shows the noise characteristic at the measurement point A. A one-dot-dashed line in FIG. 2 shows noise characteristic at the measurement point C.

As can be seen from FIG. 2, in the vicinity of 80 Hz and in the vicinity of 160 Hz, the magnitude of noise at measurement points A and C is significantly different from that at measurement point B. This significant difference in noise magnitude occurs because resonance at these frequencies occurs in the vehicle compartment 14. It is conceivable to detect the noise on the left side, on the right side and in the center of the vehicle compartment 14 in order to exactly cancel the noise having different distribution of magnitude in the vehicle compartment 14. However, in a case where the microphones 20 are provided at all of the left side, the right side, and the center of the vehicle compartment 14, complicated control is required, which leads to an increase in design cost. In addition, when the microphones 20 are provided on all of the left side, the right side, and the center of the vehicle compartment 14, the computation amount increases, and thus an expensive processor is required, which leads to an increase in component cost. As a result of intensive studies, the inventors of the present application have conceived the active noise control device 10 as described below.

Figure 4:
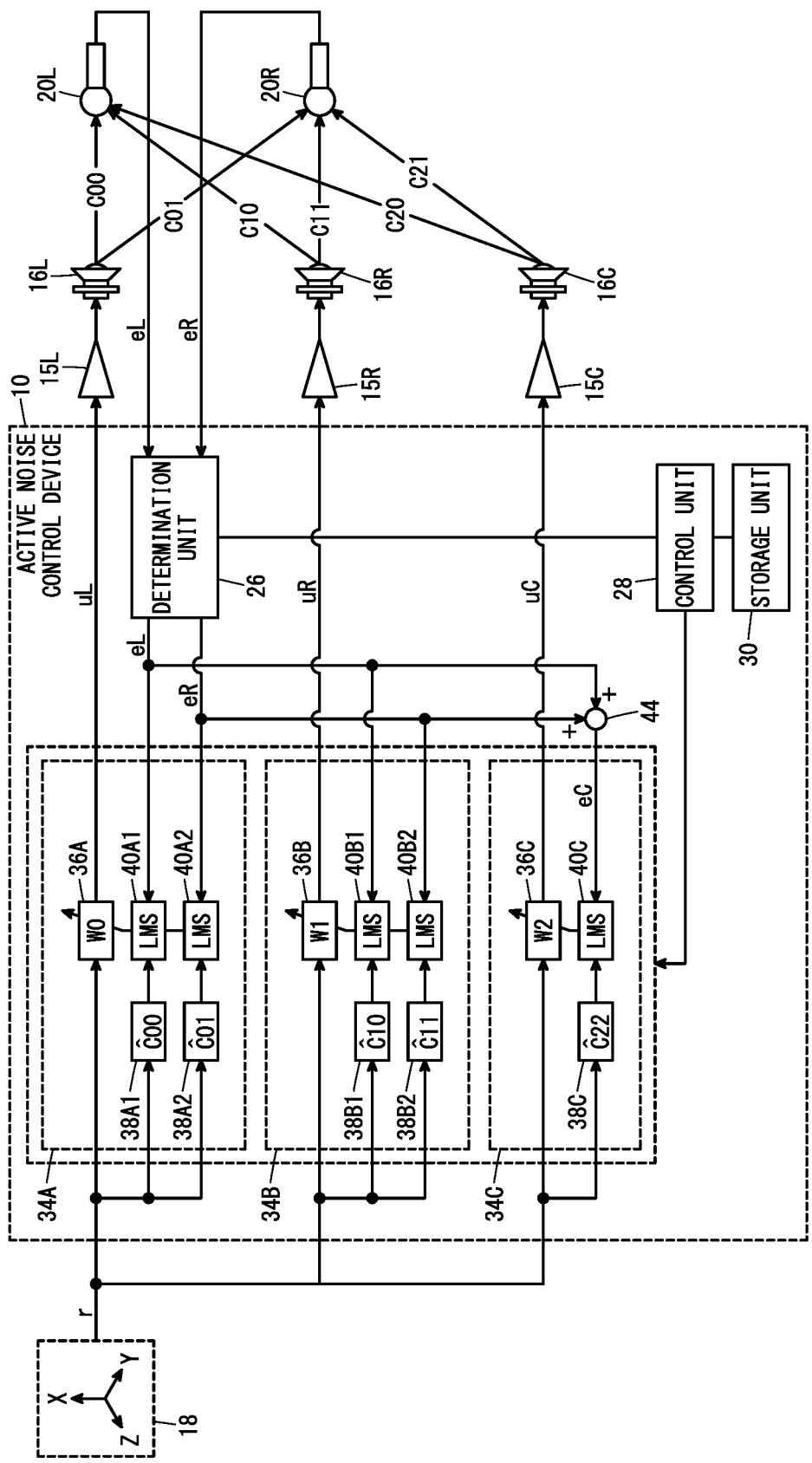
FIG. 4 is a block diagram illustrating a part of a vehicle equipped with an active noise control device according to an embodiment.
Figure 5:
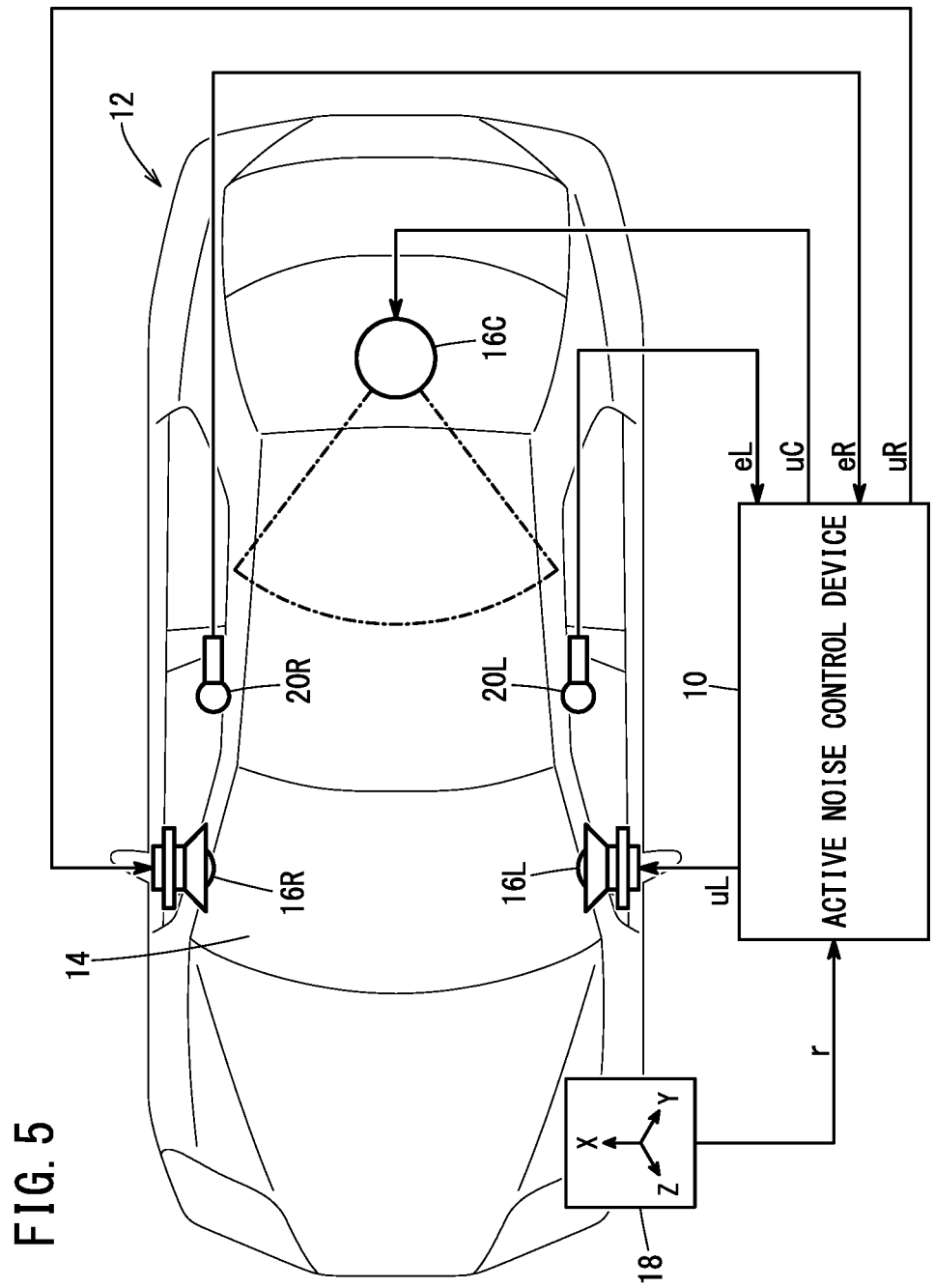
FIG. 5 is a plan view illustrating an example of a vehicle equipped with an active noise control device according to an embodiment.

FIG. 4 is a block diagram showing a part of a vehicle equipped with the active noise control device according to the present embodiment. FIG. 5 is a plan view illustrating an example of a vehicle equipped with an active noise control device according to an embodiment.

As shown in FIG. 4, the active noise control device 10 includes a determination unit 26, a control unit 28, a storage unit 30, filter units 34A to 34C, and a computation unit 44. The reference character 34 is used when describing the filter unit in general. The reference characters 34A to 34C are used when describing the individual filter units.

The active noise control device 10 includes a computation device (computational processing device) (not shown). The computation device may be configured by a processor such as a CPU (Central Processing Unit), a DSP (Digital Signal Processor), or the like. However, the present invention is not limited to this feature. A DDS (Direct Digital Synthesizer), a DCO (Digitally Controlled Oscillator), or the like can be included in the computation device. In addition, an ASIC (Application Specific Integrated Circuit), an FPGA (Field-Programmable Gate Array), or the like can be included in the computation device.

As described above, the active noise control device 10 includes the storage unit 30. The storage unit 30 may be configured by a volatile memory (not illustrated) and a nonvolatile memory (not illustrated). Examples of the volatile memory include, for example, a RAM or the like. Examples of the nonvolatile memory include, for example, a ROM, a flash memory, or the like. Data or the like may be stored, for example, in the volatile memory. Programs, tables, maps, and the like may be stored, for example, in the nonvolatile memory.

The determination unit 26, the control unit 28, the filter unit 34, and the computation unit 44 can be realized by programs, which are stored in the storage unit 30, being executed by the computation device.

As shown in FIG. 5, the vehicle 12 may be provided with a vibration sensor 18. As the vibration sensor 18, for example, an acceleration sensor may be used, but the vibration sensor 18 is not limited thereto. As the acceleration sensor, for example, a three axis acceleration sensor can be used, but the acceleration sensor is not limited thereto. Although one vibration sensor 18 is illustrated in FIG. 5, the number of vibration sensors 18 is not limited to one. The vibration detected by the vibration sensor 18 is supplied to the active noise control device 10 as a reference signal r.

As shown in FIG. 5, microphones 20L and 20R for detecting residual noise caused by interference between noise and a canceling sound are provided in the vehicle compartment 14. That is, microphones 20L and 20R for detecting error signals e are provided in the vehicle compartment 14. The reference character 20 is used when describing the microphone in general. The reference characters 20L and 20R are used when describing individual microphones. The microphone 20L is provided on one side (left side) in the vehicle compartment 14 with respect to a center line CL (see FIG. 3) of the vehicle 12 in the front-rear direction of the vehicle 12. The microphone 20R is provided on the other side (right side) in the vehicle compartment 14 with respect to the center line CL of the vehicle 12 in the front-rear direction of the vehicle 12.

As shown in FIG. 5, actuators 16L, 16R, and 16C that output canceling sounds based on the control signals u are provided in the vehicle compartment 14. The reference numeral 16 will be used when describing the actuator in general, whereas the reference numerals 16L, 16R, and 16C will be used when describing the individual actuators. The actuator 16 may be, for example, a speaker. The actuator (one-side actuator) 16L is provided on one side (left side) in the vehicle compartment 14 with respect to the center line CL of the vehicle 12 in the front-rear direction of the vehicle 12. The actuator (other-side actuator) 16R is provided on the other side (right side) in the vehicle compartment 14 with respect to the center line CL of the vehicle 12 in the front-rear direction of the vehicle 12. The actuator 16C is provided on the center line CL of the vehicle 12 in the front-rear direction of the vehicle 12. That is, the actuator 16C is provided at the center in the vehicle width direction. The distance between the actuator 16C and the microphone 20L and the distance between the actuator 16C and the microphone 20R are equal to each other.

As shown in FIG. 4, the filter unit 34A includes an adaptive filter 36A, acoustic characteristic filters 38A1 and 38A2, and filter coefficient updating units 40A1 and 40A2. The filter unit 34B includes an adaptive filter 36B, acoustic characteristic filters 38B1 and 38B2, and filter coefficient updating units 40B1 and 40B2. The filter unit 34C includes an adaptive filter 36C, an acoustic characteristic filter 38C, and a filter coefficient updating unit 40C. The reference character 36 is used when describing the adaptive filter in general. The reference characters 36A, 36B, and 36C are used when describing the individual adaptive filters. The reference character 38 is used when describing the acoustic characteristic filter in general. The reference characters 38A1, 38A2, 38B1, 38B2, and 38C are used when describing the individual acoustic characteristic filters. The reference character 40 is used when describing the filter coefficient updating unit in general. The reference characters 40A1, 40A2, 40B1, 40B2, and 40C are used when describing each of the filter coefficient updating units.

The adaptive filter (second adaptive filter) 36A generates a control signal uL by performing a filtering process on the reference signal r. The adaptive filter (third adaptive filter) 36B generates a control signal uR by performing a filtering process on the reference signal r. The adaptive filter (first adaptive filter) 36C generates a control signal uC by performing a filtering process on the reference signal r. The reference character u is used when describing a control signal in general. The reference characters uL, uR, and uC are used when describing the individual control signals. As the adaptive filter 36, for example, an FIR (Finite Impulse Response) filter or the like can be used, but the present invention is not limited to this feature. The FIR filter can generate the control signal u by performing a convolution operation on the reference signal r.

A filter coefficient W0 of the adaptive filter 36A is updated by the filter coefficient updating units 40A1 and 40A2 as described later. A filter coefficient W1 of the adaptive filter 36B is updated by the filter coefficient updating units 40B1 and 40B2 as described later. A filter coefficient W2 of the adaptive filter 36C is updated by the filter coefficient updating unit 40C as described later. The filter coefficient W0 of the adaptive filter 36A, the filter coefficient W1 of the adaptive filter 36B, and the filter coefficient W2 of the adaptive filter 36C are different from each other. Therefore, the filtering process performed by the adaptive filter 36A, the filtering process performed by the adaptive filter 36B, and the filtering process performed by the adaptive filter 36C are different from each other.

The acoustic characteristic filter 38A1 corrects the reference signal r by performing a filtering process on the reference signal r according to an acoustic characteristic (transfer characteristic) from the actuator 16L to the microphone 20L. The acoustic characteristic from the actuator 16L to the microphone 20L is obtained in advance. That is, a transfer characteristic $\hat{C}00$ from the actuator 16L to the microphone 20L is obtained in advance. The acoustic characteristic filter 38A2 corrects the reference signal r by performing a filtering process on the reference signal r according to an acoustic characteristic from the actuator 16L to the microphone 20R. The acoustic characteristic from the actuator 16L to the microphone 20R is obtained in advance. That is, a transfer characteristic $\hat{C}01$ from the actuator 16L to the microphone 20R is obtained in advance.

The acoustic characteristic filter 38B1 corrects the reference signal r by performing a filtering process on the reference signal r according to an acoustic characteristic from the actuator 16R to the microphone 20L. The acoustic characteristic from the actuator 16R to the microphone 20L is obtained in advance. That is, a transfer characteristic $\hat{C}10$ from the actuator 16R to the microphone 20L is obtained in advance. The acoustic characteristic filter 38B2 corrects the reference signals r by performing a filtering process on the reference signals r according to an acoustic characteristic from the actuator 16R to the microphone 20R. The acoustic characteristic from the actuator 16R to the microphone 20R is obtained in advance. That is, a transfer characteristic $\hat{C}11$ from the actuator 16R to the microphone 20R is obtained in advance.

The acoustic characteristic filter 38C corrects the reference signal r by performing a filtering process on the reference signal r in accordance with an acoustic characteristic from the actuator 16C to the microphone 20L and an acoustic characteristic from the actuator 16C to the microphone 20R. That is, the acoustic characteristic filter 38C corrects the reference signal r by performing a filtering process on the reference signal r in accordance with the acoustic characteristics from the actuator 16C to a pair of microphones 20L and 20R. The acoustic characteristic from the actuator 16C to the microphone 20L is obtained in advance. In other words, a transfer characteristic $\hat{C}20$ from the actuator 16C to the microphone 20L is obtained in advance. The acoustic characteristic from the actuator 16C to the microphone 20R is obtained in advance. That is, a transfer characteristic $\hat{C}21$ from the actuator 16C to the microphones 20R is obtained in advance. The acoustic characteristics from the actuator 16C to the pair of microphones 20L and 20R can be expressed by expression (1) as follows. That is, a transfer characteristic $\hat{C}22$ from the actuator 16C to the pair of microphones 20L and 20R can be expressed by expression (1) as follows.

$$\hat{C}22 = \hat{C}20 + \hat{C}21 \qquad (1)$$

That is, the acoustic characteristic from the actuator 16C to the pair of the microphones 20L and 20R can be obtained based on an added acoustic characteristic obtained by adding the acoustic characteristic from the actuator 16C to the microphone 20L and the acoustic characteristic from the actuator 16C to the microphone 20R.

The filter coefficient updating unit 40A1 updates the filter coefficient W0 of the adaptive filter 36A based on an error signal eL acquired by detecting the residual noise by the microphone 20L and the reference signal r corrected by the acoustic characteristic filter 38A1. More specifically, the filter coefficient updating unit 40A1 updates the filter coefficient W0 of the adaptive filter 36A such that the error signal eL acquired by detecting the residual noise by the microphone 20L is minimized.

The filter coefficient updating unit 40A2 updates the filter coefficient W0 of the adaptive filter 36A based on an error signal eR acquired by detecting the residual noise by the microphone 20R and the reference signal r corrected by the acoustic characteristic filter 38A2. More specifically, the filter coefficient updating unit 40A2 updates the filter coefficient W0 of the adaptive filter 36A such that the error signal eR acquired by detecting the residual noise by the microphone 20R is minimized.

The reference character e is used when describing the error signal in general, whereas the reference characters eL, eR, and eC are used when describing the individual error signals. The reference character W is used when describing the filter coefficient in general. The reference characters W0, W1, and W2 are used when describing the individual filter coefficients. When the filter coefficient W is updated, for example, a filtered-X LMS algorithm can be used, but the present invention is not limited to this feature.

The filter coefficient updating unit 40B1 updates the filter coefficient W1 of the adaptive filter 36B based on the error signal eL acquired by detecting the residual noise by the microphone 20L and the reference signal r corrected by the acoustic characteristic filter 38B1. More specifically, the filter coefficient updating unit 40B1 updates the filter coefficient W1 of the adaptive filter 36B such that the error signal eL acquired by detecting the residual noise by the microphone 20L is minimized.

The filter coefficient updating unit 40B2 updates the filter coefficient W1 of the adaptive filter 36B based on the error signal eR acquired by detecting the residual noise by the microphone 20R and the reference signal r corrected by the acoustic characteristic filter 38B2. More specifically, the filter coefficient updating unit 40B2 updates the filter coefficient W1 of the adaptive filter 36B such that the error signal eR acquired by detecting the residual noise by the microphone 20R is minimized.

The computation unit 44 adds the error signal eL acquired by detecting the residual noise by the microphone 20L and the error signal eR acquired by detecting the residual noise by the microphone 20R. The computation unit (adder) 44 supplies the added error signal eC acquired by adding the error signal eL and the error signal eR, to the filter coefficient updating unit 40C.

Figure 6:
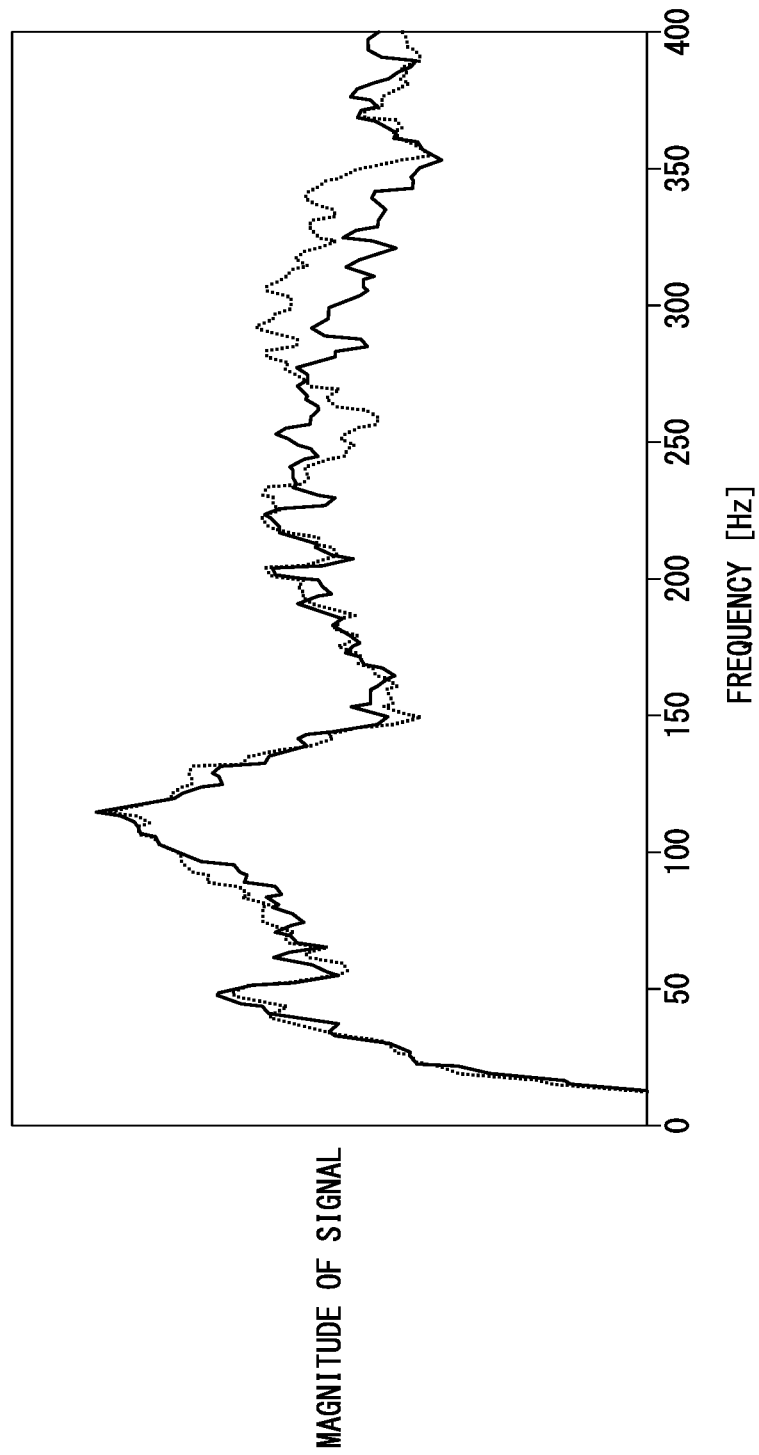
FIG. 6 is a graph illustrating an example of an added error signal.

FIG. 6 is a graph illustrating an example of an added error signal. The horizontal axis in FIG. 6 indicates frequency, and the vertical axis in FIG. 6 indicates magnitude of the signal. A solid line in FIG. 6 is obtained by dividing by two, an addition value that is obtained by adding the error signal eL acquired by detecting the residual noise by the microphone 20L and the error signal eR acquired by detecting the residual noise by the microphone 20R. That is, the solid line in FIG. 6 is an average value of the error signal eL acquired by detecting the residual noise by the microphone 20L and the error signal eR acquired by detecting the residual noise by the microphone 20R. A dotted line in FIG. 6 illustrates residual noise detected by a microphone when the microphone is disposed at the center in the vehicle width direction. As can be seen from FIG. 6, the difference between them is very small. Therefore, even if the added error signal eC acquired by adding the error signal eL detected by the microphone 20L and the error signal eR detected by the microphone 20R are used, there is no particular problem with the accuracy of noise suppression.

The filter coefficient updating unit 40C updates the filter coefficient W2 of the adaptive filter 36C, based on the added error signal eC supplied from the computation unit 44 and the reference signal r corrected by the acoustic characteristic filter 38C. More specifically, the filter coefficient updating unit 40C updates the filter coefficient W2 of the adaptive filter 36C such that the error signal eC is minimized.

The control signal uL output from the adaptive filter 36A is supplied to the actuator 16L via a power amplifier 15L. That is, the control signal uL output from the filter unit 34A is supplied to the actuator 16L via the power amplifier 15L. The control signal uR output from the adaptive filter 36B is supplied to the actuator 16R via a power amplifier 15R. That is, the control signal uR output from the filter unit 34B is supplied to the actuator 16R via the power amplifier 15R. The control signal uC output from the adaptive filter 36C is supplied to the actuator 16C via a power amplifier 15C. That is, the control signal uC output from the filter unit 34B is supplied to the actuator 16C via the power amplifier 15C.

The determination unit (abnormality determination unit) 26 can determine whether or not an abnormality has occurred in either of the error signal eL acquired by the microphone 20L or the error signal eR acquired by the microphone 20R. As examples of such an abnormality, there may be cited a disconnection of a wire between the microphone 20 and the active noise control device 10, failure of microphone 20, and the like but are not limited to these examples. When the magnitude of the error signal eL is larger than or equal to a volume threshold value VTH, the magnitude of the error signal eR is smaller than the threshold value VTH, and such a state continues for time threshold value TTH or longer, the determination unit 26 performs the following determination. That is, in such a case, the determination unit 26 determines that an abnormality has occurred in the error signal eR acquired by the microphone 20R. When the magnitude of the error signal eR is equal to or larger than a volume threshold value VTH, the magnitude of the error signal eL is smaller than the volume threshold value VTH, and such a state continues for a time threshold value TTH or longer, the determination unit 26 performs the following determination. That is, in such a case, the determination unit 26 determines that an abnormality has occurred in the error signal eL acquired by the microphones 20L. The determination result by the determination unit 26 is supplied to the control unit 28.

When the determination unit 26 determines that an abnormality occurs in one of the error signal eL or the error signal eR, the control unit 28 can perform the following control. That is, in such a case, the control unit 28 causes the filter coefficient updating unit 40C to update the filter coefficient W2 of the adaptive filter 36C, based on the other of the error signals eL and eR and the reference signal r corrected by the acoustic characteristic filter 38C.

Figure 7:
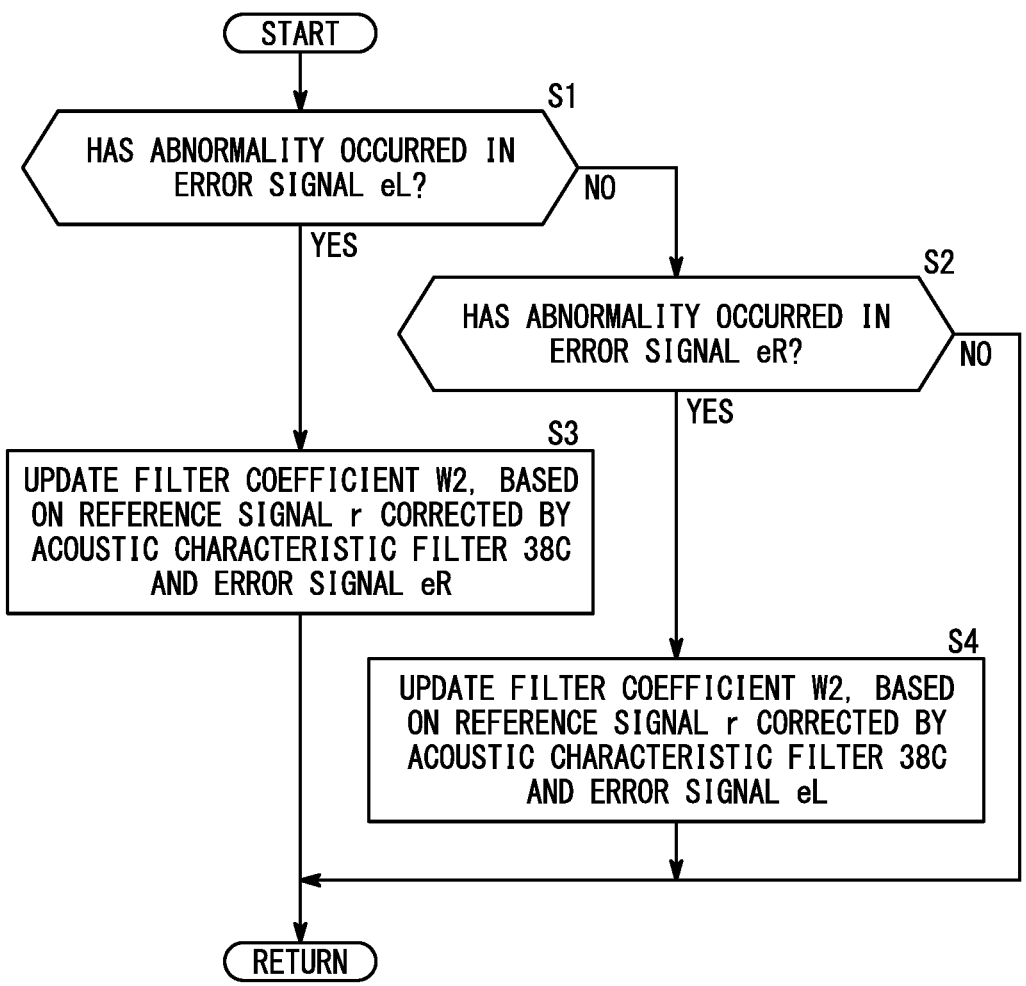
FIG. 7 is a flowchart illustrating an example of operations of the active noise control device according to the present embodiment.

Next, an example of operations of the active noise control device according to the present embodiment will be described with reference to FIG. 7. FIG. 7 is a flowchart illustrating an example of operations of the active noise control device according to the present embodiment.

First, in step S1, the determination unit 26 determines whether or not an abnormality has occurred in the error signal eL. When an abnormality has occurred in the error signal eL (YES in step S1), the process transitions to step S3. If no abnormality has occurred in the error signal eL (NO in step S1), the process transitions to step S2.

In step S2, the determination unit 26 determines whether or not an abnormality has occurred in the error signal eR. When an abnormality has occurred in the error signal eR (YES in step S2), the process transitions to step S4. When no abnormality has occurred in the error signal eR (NO in step S2), the process illustrated in FIG. 7 is completed.

In step S3, the control unit 28 causes the filter coefficient updating unit 40C to update the filter coefficient W2 of the adaptive filter 36C, based on the reference signal r corrected by the acoustic characteristic filter 38C and the error signal eR.

In step S4, the control unit 28 causes the filter coefficient updating unit 40C to update the filter coefficient W2 of the adaptive filter 36C, based on the reference signal r corrected by the acoustic characteristic filter 38C and the error signal eL.

In this manner, the process shown in FIG. 7 is brought to an end.

As described above, in the present embodiment, the error signal eL detected by the microphone 20L arranged on one side and the error signal eR detected by the microphone 20R arranged on the other side are added to acquire the added error signal eC. The added error signal eC corresponds to the residual noise at the center in the vehicle width direction. Then, the filter coefficient W2 of the adaptive filter 36C is updated such that the added error signal eC acquired in this way is minimized. According to the present embodiment, it is possible to accurately reduce residual noise at the center in the vehicle width direction without separately providing a microphone at the center in the vehicle width direction. According to the present embodiment, the complexity of control can be suppressed, and thus the design cost can be suppressed. In addition, according to the present embodiment, since an increase in the amount of computation can be suppressed, an expensive processor is not required, and component cost can be suppressed. Therefore, according to the present embodiment, it is possible to provide the active noise control device 10 that is capable of suitably reducing noise and realizing cost reduction.

Modified Embodiment

Although preferred embodiments of the present invention have been described above, the present invention is not limited to the above-described embodiments, and various modifications can be made thereto without departing from the essence and gist of the present invention.

For example, in the above-described embodiment, although an exemplary case has been described in which the central actuator 16C is provided, the central actuator 16C may be dispensed with. In this case, the identical control signal may be supplied to the one-side actuator 16L and the other-side actuator 16R. That is, the central actuator 16C need not necessarily be provided if a monaural sound is output by the pair of actuators 16L and 16R. However, from the viewpoint of more effectively reducing noise, it is preferable for the central actuator 16C to be provided.

The above-described embodiments can be summarized in the following manner.

The active noise control device (10) causes the actuator (16C) to output a canceling sound based on the control signal (uC) in order to reduce noise in the vehicle compartment (14) of the vehicle (12), and includes the first adaptive filter (34C) configured to generate the control signal by performing a filtering process on the reference signal (r) corresponding to the noise, and the first filter coefficient updating unit (40C) configured to update the filter coefficient (W2) of the first adaptive filter, based on the reference signal and the added error signal (eC) that is acquired by adding the first error signal (eL) acquired by detecting residual noise due to interference between the noise and the canceling sound by the first microphone (20L) disposed on one side in the vehicle compartment with respect to the center line (CL) of the vehicle in a front-rear direction of the vehicle, and the second error signal (eR) acquired by detecting the residual noise by the second microphone (20R) disposed on another side in the vehicle compartment with respect to the center line of the vehicle. According to such a configuration, by adding the first error signal detected by the first microphone disposed on one side and the second error signal detected by the second microphone disposed on the other side, the added error signal is acquired, corresponding to the residual noise at the center in the vehicle width direction. Then, the filter coefficient of the first adaptive filter is updated so as to minimize the added error signal acquired in such a way. According to such a configuration, the residual noise at the center in the vehicle width direction can be accurately reduced without separately providing a microphone at the center in the vehicle width direction. According to such a configuration, the complexity of control can be suppressed, and thus the design cost can be suppressed. In addition, according to such a configuration, since an increase in the amount of computation can be suppressed, an expensive processor is not required, and the component cost can be suppressed. Therefore, according to such a configuration, it is possible to provide an active noise control device that is capable of suitably reducing noise and realizing cost reduction.

The active noise control device may further include the first acoustic characteristic filter (38C) configured to correct the reference signal by performing a filtering process on the reference signal according to the acoustic characteristic ($\hat{C}20$) from the actuator to the first microphone and an acoustic characteristic ($\hat{C}21$) from the actuator to the second microphone, wherein the first filter coefficient updating unit may be configured to update the filter coefficient of the first adaptive filter, based on the added error signal and the reference signal corrected by the first acoustic characteristic filter. According to such a configuration, since the filtering process according to the acoustic characteristics from the actuator to the pair of microphones is performed by the first acoustic characteristic filter, it is possible to effectively suppress noise while suppressing the amount of computation.

The active noise control device may further include the determination unit (26) configured to determine whether an abnormality has occurred in either of the first error signal or the second error signal, and the control unit (28) configured to cause the first filter coefficient updating unit to update the filter coefficient of the first adaptive filter, when the determination unit determines that the abnormality has occurred in one of the first error signal or the second error signal, the filter coefficient of the first adaptive filter being updated based on the reference signal corrected by the first acoustic characteristic filter and another of the first error signal or the second error signal. According to such a configuration, even when an abnormality occurs in either one of the pair of microphones, it is possible to suitably reduce noise while suppressing an adverse effect of the microphone in which the abnormality occurs.

The actuator may be provided at the center in the vehicle width direction. According to such a configuration, it is possible to provide an active noise control device that is capable of suitably reducing noise in a vehicle compartment.

The active noise control device may further include the second adaptive filter (36A) configured to perform a filtering process that is different from the filtering process performed by the first adaptive filter, on the reference signal to generate the control signal (uL) to be supplied to the one-side actuator (16L) disposed on the one side in the vehicle compartment with respect to the center line of the vehicle, the second acoustic characteristic filter (38A1) configured to correct the reference signal by performing a filtering process on the reference signal according to the acoustic characteristic ($\hat{C}00$) from the one-side actuator to the first microphone, the second filter coefficient updating unit (40A1) configured to update the filter coefficient (W0) of the second adaptive filter, based on the first error signal and the reference signal corrected by the second acoustic characteristic filter, the third acoustic characteristic filter (38A2) configured to correct the reference signal by performing a filtering process on the reference signal according to the acoustic characteristic ($\hat{C}01$) from the one-side actuator to the second microphone, the third filter coefficient updating unit (40A2) configured to update the filter coefficient of the second adaptive filter, based on the second error signal and the reference signal corrected by the third acoustic characteristic filter, the third adaptive filter (36B) configured to perform a filtering process different from both the filtering process performed by the first adaptive filter and the filtering process performed by the second adaptive filter, on the reference signal to generate the control signal (uR) to be supplied to the other-side actuator (16R) disposed on the another side in the vehicle compartment with respect to the center line of the vehicle, the fourth acoustic characteristic filter (38B1) configured to correct the reference signal by performing a filtering process on the reference signal according to the acoustic characteristic ($\hat{C}10$) from the other-side actuator to the first microphone, the fourth filter coefficient updating unit (40B1) configured to update a filter coefficient (W1) of the third adaptive filter based on the first error signal and the reference signal corrected by the fourth acoustic characteristic filter, the fifth acoustic characteristic filter (38B2) configured to correct the reference signal by performing a filtering process on the reference signal according to the acoustic characteristic ($\hat{C}11$) from the other-side actuator to the second microphone, and the fifth filter coefficient updating unit (40B2) configured to update the filter coefficient of the third adaptive filter based on the second error signal and the reference signal corrected by the fifth acoustic characteristic filter. According to such a configuration, it is possible to provide an active noise control device that is capable of suitably reducing noise.

The actuator may include the one-side actuator disposed on the one side in the vehicle compartment with respect to the center line of the vehicle and the other-side actuator disposed on the another side in the vehicle compartment with respect to the center line of the vehicle, and the identical control signal may be supplied to the one-side actuator and the other-side actuator. According to such a configuration, since it is not necessary to provide an actuator at the center in the vehicle width direction, it is possible to contribute to cost reduction.

The vehicle includes the active noise control device as described above.

What is claimed is:

1. An active noise control device that causes an actuator to output a canceling sound based on a control signal in order to reduce noise in a vehicle compartment of a vehicle, the active noise control device comprising one or more processors that execute computer-executable instructions stored in a memory, wherein the one or more processors execute the computer-executable instructions to cause the active noise control device to:
    generate the control signal by performing a filtering process on a reference signal corresponding to the noise, by a first adaptive filter; and
    update a filter coefficient of the first adaptive filter, based on the reference signal and an added error signal that is acquired by adding a first error signal acquired by detecting residual noise due to interference between the noise and the canceling sound by a first microphone disposed on one side in the vehicle compartment with respect to a center line of the vehicle in a front-rear direction of the vehicle, and a second error signal acquired by detecting the residual noise by a second microphone disposed on another side in the vehicle compartment with respect to the center line of the vehicle;
    the active noise control device further comprises a first acoustic characteristic filter configured to correct the reference signal by performing a filtering process on the reference signal according to an acoustic characteristic from the actuator to the first microphone and an acoustic characteristic from the actuator to the second microphone,
    wherein the one or more processors further cause the active noise control device to:
    update the filter coefficient of the first adaptive filter, based on the added error signal and the reference signal corrected by the first acoustic characteristic filter,
    determine whether an abnormality has occurred in either of the first error signal or the second error signal; and
    update the filter coefficient of the first adaptive filter, when it is determined that the abnormality has occurred in one of the first error signal or the second error signal, the filter coefficient of the first adaptive filter being updated based on the reference signal corrected by the first acoustic characteristic filter and another of the first error signal or the second error signal.

2. The active noise control device according to claim 1, wherein the actuator is provided at a center in a vehicle width direction.

3. The active noise control device according to claim 2, further comprising:
    a second adaptive filter configured to perform a filtering process that is different from the filtering process performed by the first adaptive filter, on the reference signal to generate a control signal to be supplied to a one-side actuator disposed on the one side in the vehicle compartment with respect to the center line of the vehicle;
    a second acoustic characteristic filter configured to correct the reference signal by performing a filtering process on the reference signal according to an acoustic characteristic from the one-side actuator to the first microphone;
    a third acoustic characteristic filter configured to correct the reference signal by performing a filtering process on the reference signal according to an acoustic characteristic from the one-side actuator to the second microphone;
    a third adaptive filter configured to perform a filtering process different from both the filtering process performed by the first adaptive filter and the filtering process performed by the second adaptive filter, on the reference signal to generate a control signal to be supplied to an other-side actuator disposed on the another side in the vehicle compartment with respect to the center line of the vehicle;
    a fourth acoustic characteristic filter configured to correct the reference signal by performing a filtering process on the reference signal according to an acoustic characteristic from the other-side actuator to the first microphone; and
    a fifth acoustic characteristic filter configured to correct the reference signal by performing a filtering process on the reference signal according to an acoustic characteristic from the other-side actuator to the second microphone,
    wherein the one or more processors cause the active noise control device to:
    update a filter coefficient of the second adaptive filter, based on the first error signal and the reference signal corrected by the second acoustic characteristic filter;
    update the filter coefficient of the second adaptive filter, based on the second error signal and the reference signal corrected by the third acoustic characteristic filter;

update a filter coefficient of the third adaptive filter based on the first error signal and the reference signal corrected by the fourth acoustic characteristic filter; and update the filter coefficient of the third adaptive filter based on the second error signal and the reference signal corrected by the fifth acoustic characteristic filter.

4. The active noise control device according to claim 1, wherein the actuator includes a one-side actuator disposed on the one side in the vehicle compartment with respect to the center line of the vehicle and an other-side actuator disposed on the another side in the vehicle compartment with respect to the center line of the vehicle, and wherein an identical control signal is supplied to the one-side actuator and the other-side actuator.

5. A vehicle comprising an active noise control device that causes an actuator to output a canceling sound based on a control signal in order to reduce noise in a vehicle compartment of the vehicle, the active noise control device comprising one or more processors that execute computer-executable instructions stored in a memory, wherein the one or more processors execute the computer-executable instructions to cause the active noise control device to:

generate the control signal by performing a filtering process on a reference signal corresponding to the noise, by a first adaptive filter; and update a filter coefficient of the first adaptive filter, based on the reference signal and an added error signal that is acquired by adding a first error signal acquired by detecting residual noise due to interference between the noise and the canceling sound by a first microphone disposed on one side in the vehicle compartment with respect to a center line of the vehicle in a front-rear direction of the vehicle, and a second error signal acquired by detecting the residual noise by a second microphone disposed on another side of the center line;

the active noise control device further comprises a first acoustic characteristic filter configured to correct the reference signal by performing a filtering process on the reference signal according to an acoustic characteristic from the actuator to the first microphone and an acoustic characteristic from the actuator to the second microphone, wherein the one or more processors further cause the active noise control device to:

update the filter coefficient of the first adaptive filter, based on the added error signal and the reference signal corrected by the first acoustic characteristic filter, determine whether an abnormality has occurred in either of the first error signal or the second error signal; and update the filter coefficient of the first adaptive filter, when it is determined that the abnormality has occurred in one of the first error signal or the second error signal, the filter coefficient of the first adaptive filter being updated based on the reference signal corrected by the first acoustic characteristic filter and another of the first error signal or the second error signal.

\* \* \* \* \*